(12) United States Patent  
Hino

(10) Patent No.: US 7,440,122 B2  
(45) Date of Patent: Oct. 21, 2008

(54) IMAGE PROCESSING APPARATUS MANAGING USER PROFILES, IMAGE PROCESSING METHOD MANAGING USER PROFILES, AND STORAGE MEDIUM THEREOF

(75) Inventor: Yasuhiro Hino, Yokahama (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 11/329,192

(22) Filed: Jan. 11, 2006

(65) Prior Publication Data

US 2006/0109528 A1    May 25, 2006

Related U.S. Application Data

(62) Division of application No. 09/708,477, filed on Nov. 9, 2000, now Pat. No. 7,023,565.

(30) Foreign Application Priority Data

Nov. 12, 1999  (JP)  ................. 11-323199  
Oct. 19, 2000  (JP)  ................. 2000-319932

(51) Int. Cl.  
*G06F 15/00*  (2006.01)  
*G06F 3/12*  (2006.01)  
*G06K 1/00*  (2006.01)  
*H04N 1/60*  (2006.01)

(52) U.S. Cl. ........................... 358/1.1; 358/1.9; 358/1.6

(58) Field of Classification Search ................. 358/1.1, 358/1.15, 1.14, 1.13, 1.6, 1.9, 1.18  
See application file for complete search history.

(56) References Cited

U.S. PATENT DOCUMENTS 5,495,349 A    2/1996  Ikeda ......................... 358/518  
5,689,625 A *  11/1997 Austin et al. ............... 358/1.15

\* cited by examiner

*Primary Examiner*—Douglas Q Tran  
(74) *Attorney, Agent, or Firm*—Fitzpatrick, Cella, Harper & Scinto

(57) ABSTRACT

An image processing apparatus is provided. The image processing apparatus includes a holding unit means for holding setting information for every user, an input unit for inputting a print job, and an adjustment unit for specifying a user who instructs the print job according to print job information and adjusting a color image on the basis of the setting information of the specified user. Accordingly, a precise color adjustment fitting to each user can be realized by providing the profile for the color adjustment for every user.

12 Claims, 15 Drawing Sheets

FIG. 11

```
yamamoto
color adjustment
red (R) ?
- ←   + 3 0   → +
```

FIG. 12

```
< user : yamamoto >
density : + 2 0
red (R) + 3 0    blue (B) 1 0
green (G) : + 0
```

FIG. 15

```
<user:yamamoto>
   Sample No.?
    -←  0  →+
```

FIG. 16

```
user name?

←  tanaka  →
```

| suzuki@··· | 0 | 0 | 0 |
| sato@··· | 0 | 0 | 0 |
| yamamoto@··· | 0 | 30 | 0 |
| ⋮ | ⋮ | ⋮ | ⋮ |

IMAGE PROCESSING APPARATUS MANAGING USER PROFILES, IMAGE PROCESSING METHOD MANAGING USER PROFILES, AND STORAGE MEDIUM THEREOF

CROSS-REFERENCE TO RELATED APPLICATIONS

This application is a divisional application of application Ser. No. 09/708,477, now allowed, filed Nov. 9, 2000, which is incorporated herein by reference.

BACKGROUND OF THE INVENTION

1. Field of the Invention

The present invention relates to an image processing apparatus, an image processing method for managing setting information every user, and a storage medium.

2. Related Background Art

In a conventional printer unit which applies page description language (PDL), it is general to perform printing output by receiving data with an RGB format for color designation of color data and a GRAY (gray scale) format for color designation of monochrome data, and converting the received data into a CMYK format.

When color conversion from the RGB format into the CMYK format is performed, a finetuned conversion result is calculated as CMYK values according to a mechanical process of the printer unit or the printing content. Since this color conversion method is held in the printer unit as a previously determined conversion expression or a conversion coefficient, this method is uniformly applied to printing data being an output target (or an output object).

However, an impression for the output color is different for each user and influenced by an individual fancy or desire. Furthermore, for a user such as an aged person or a handicapped person in color vision, there occurs a problem that colors hard to be discriminated or viewed by an normal output result exist.

Therefore, in case of commonly possessing the above conventional printer unit by the plural users, it was difficult to satisfy all the users with regard to color adjustment.

SUMMARY OF THE INVENTION

The present invention is applied under the consideration of the above conventional example and an object is to provide an image processing apparatus and a method thereof capable of performing an optimal color adjustment every user.

An image processing apparatus of the present invention comprises: a hold means for holding setting information every user; an input means for inputting a print job; and an adjustment means for specifying a user who instructs the print job according to print job information and adjusting a color image on the basis of said setting in formation of the specified user.

Other objects and features of the present invention will become apparent from the following detailed description and the attached drawings.

BRIEF DESCRIPTION OF THE DRAWINGS

FIG. 11 is a diagram showing an example of a user interface in the first embodiment;

FIG. 12 is a diagram showing a display example of the profile content in the first embodiment;

FIG. 15 is a diagram showing an example of a user interface in the second embodiment;

FIG. 16 is a diagram showing an example of the user interface in the second embodiment;

DETAILED DESCRIPTION OF THE PREFERRED EMBODIMENTS

Hereinafter, the embodiments of the present invention will be explained in detail with reference to the accompanying drawings.

First Embodiment (Mechanical Structure)

At first, the structure of a laser beam printer (hereinafter LBP) preferable for applying the first embodiment will be described with reference to FIG. 1. It is needless to say that a printer applying the present embodiment is not limited to the LBP but may be a printer of another printing system.

Figure 1:
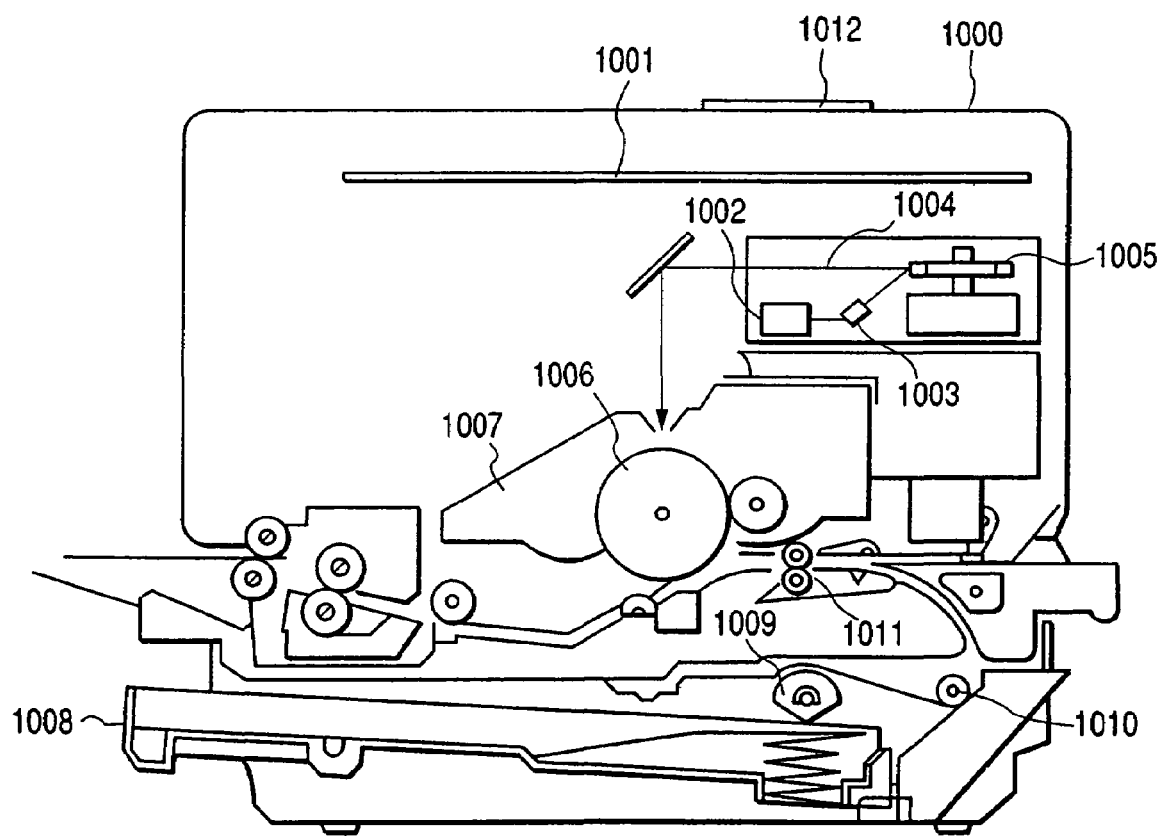
FIG. 1 is a side cross sectional diagram of an LBP (laser beam printer) according to the first embodiment of the present invention.

FIG. 1 is a cross sectional diagram showing the internal structure of the LBP to which the present embodiment is applied. This LBP can register character patterns from a source of data (not shown) and a fixed style font (form data). In FIG. 1, numeral 1000 denotes an LBP main body, to which character information (character code) supplied from a host computer connected to an external, form information and a macro command are input to be stored into the LBP, where corresponding character patterns and form patterns are produced according to the above information, and an image is formed onto a recording sheet being a recording medium.

Numeral 1012 denotes an operation panel (unit), where switches used for operations, an LED display unit and the like are arranged. Numeral 1001 denotes a printer control unit which entirely controls the LBP 1000 and analyzes the character information or the like supplied from the host computer.

The printer control unit 1001 converts mainly the character information into a video signal of character patterns which correspond to the character information, then outputs the video signal to a laser driver 1002. The laser driver 1002 is a circuit for driving a semiconductor laser unit 1003 and performs an ON/OFF switching operation of a laser beam 1004 irradiated from the semiconductor laser unit 1003 corresponding to the input video signal. The laser beam 1004 is reflected to the right and left directions by a rotative polygon mirror 1005 to scan a surface of an electrostatic drum 1106. Accordingly, an electrostatic latent image of the character patterns is formed onto the electrostatic drum 1006. This latent image is developed by a developing unit 1007 around the electrostatic drum 1006, thereafter, it is transferred onto the recording sheet. As the recording sheet, a cut sheet is used. The cut sheet (recording sheet) is stored in a sheet cassette 1008 installed in the LBP 1000 and is taken inside the LBP main body by a feed roller 1009 and carriage rollers 1010 and 1011 to be supplied to the electrostatic drum 1006.

(Functional Structure)

Figure 2:
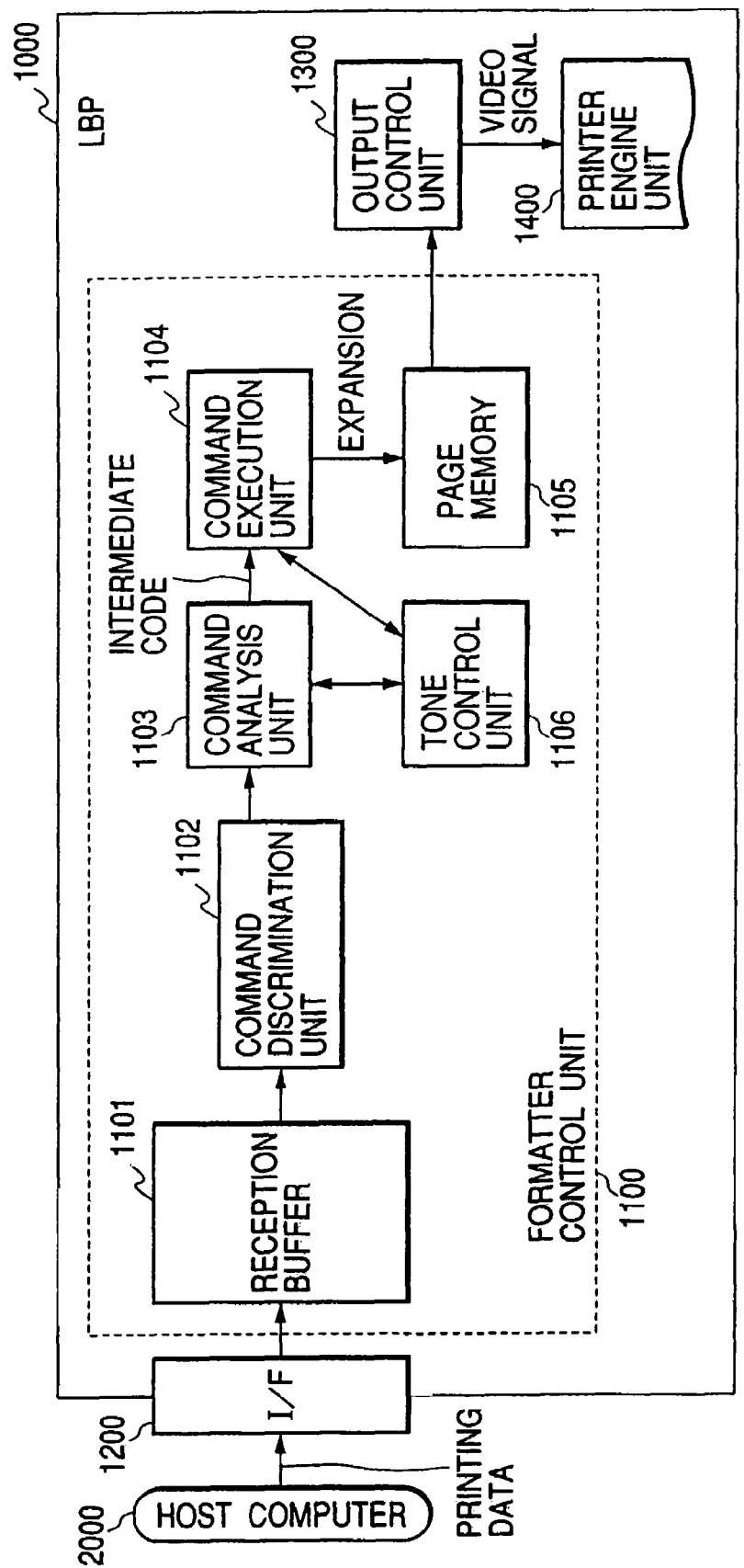
FIG. 2 is a block diagram showing the functional structure of the LBP in the first embodiment.

FIG. 2 is a block diagram showing the functional structure of the above LBP 1000.

In FIG. 2, numeral 2000 denotes a host computer, which is connected to the LBP 1000, outputs printing information constituted by printing data and control codes to the LBP 1000.

The LBP 1000 is roughly composed of a formatter control unit 1100, an interface unit 1200, an output control unit 1300 and a printer engine unit 1400.

The formatter control unit 1100 is composed of a reception buffer 1101, a command discrimination unit 1102, a command analysis unit 1103, a command execution unit 1104, a page memory 1105 and a tone control unit 1106.

The reception buffer 1101 is storage means for temporally storing the printing information received from the host computer 2000. The command discrimination unit 1102 discriminates each print control command. The printing data is analyzed in the command analysis unit 1103 corresponding to the each command. The command analysis unit 1103 analyzes the each print control command. The command analyzed in the command analysis unit 1103 is in an intermediate result of performing an analysis of the printing data and is converted into an intermediate code format of more executable in the command execution unit 1104.

In the command discrimination unit 1102, when it is discriminated that the print control command is such a command of accompanying an expansion into the intermediate code format such as characters and figures, a color attribute is controlled in the tone control unit 1106. The tone control unit 1106 converts a designated color into the optimal color for a user who executed printing processing.

In the command execution unit 1104, the each command is executed by the above intermediate code, and the commands regarding drawing and printing are sequentially expanded into the page memory 1105.

Generally, the formatter control unit 1100 is composed of a computer system which employs a CPU, a ROM, a RAM and the like.

The output control unit 1300 converts the content of the page memory 1105 into a video signal to transfer image data to the printer engine unit 1400. The printer engine unit 1400 is a printing mechanism portion for forming a permanent visible image onto the recording sheet based on the received video signal.

(System Structure)

Figure 3:
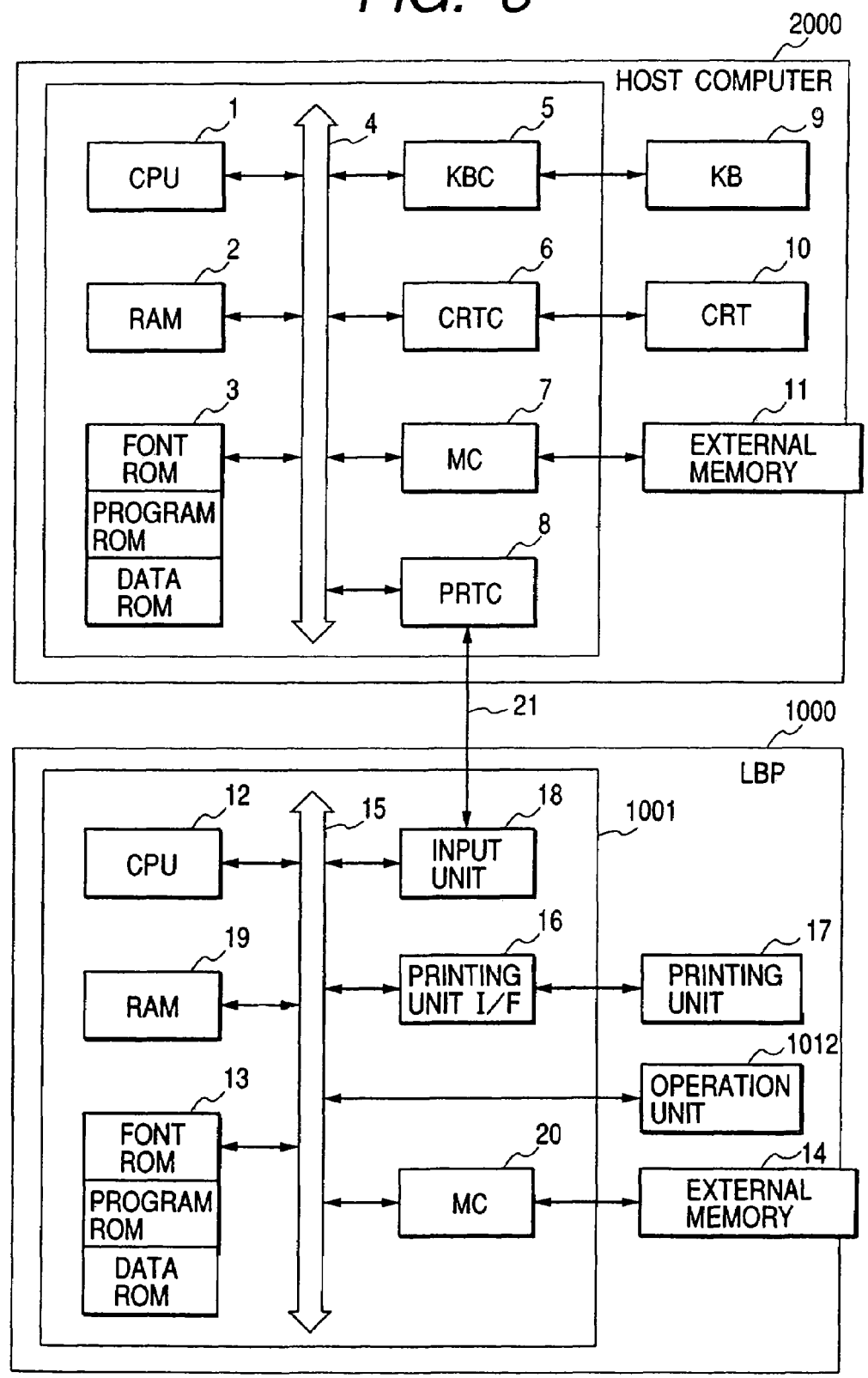
FIG. 3 is a block diagram showing the structure of a printer control system in the first embodiment.

FIG. 3 is a block diagram showing the structure of a printer control system for controlling the LBP 100 in the present embodiment. It is needless to say that the present invention is applicable to a single equipment, a system composed of plural equipments or a system for executing processing through a network such as a LAN (Local Area Network) or the like, if the function of the present embodiment is executed.

In FIG. 3, the host computer 2000 has a CPU 1 which executes word processing of mixedly containing various target information to be processed such as figures, images, characters, tables (includes calculation in tables) and the like on the basis of a word processing program stored into a program ROM in a ROM 3. Each device connected to a system bus 4 is entirely controlled by the CPU 1. A control program or the like of the CPU 1 is stored into the program ROM in the ROM 3, font data or the like used in the above word processing is stored into a font ROM in the ROM 3 and various data used in case of executing the above word processing or the like is stored into a data ROM in the ROM 3. A RAM 2 functions as a main memory of the CPU 1, a work area or the like.

Numeral 5 denotes a key board controller (KBC) which controls key inputting from a key board 9 or a pointing device (not shown). Numeral 6 denotes a CRT controller (CRTC) which controls displaying of a CRT display (CRT) 10. Numeral 7 denotes a memory controller (MC) which controls accessing to an external memory 11 such as a hard disk (HD) for storing a boot program, various application software, font data, user files, editing files and the like, a floppy disk (FD) or the like. Numeral 8 denotes a printer controller (PRTC) which is connected to the printer 1060 through a predetermined interactive interface (interface) 21 and executes control processing of a communication with the printer 1000.

The CPU 1 executes, for example, expansion (rasterize) processing of an outline font to display information set on the RAM 2 so as to realize an WYSIWYG (user interface of "what you see is what you get") on the CRT 10. Also, the CPU 1 opens various registered windows on the basis of commands instructed by use of a mouse cursor (not shown) or the like on the CRT 10 and executes various data processing.

In the LBP 1000, numeral 12 denotes a printer CPU which overall controls accessing to various devices connected to a system bus 15 on the basis of a control program or the like stored into a program ROM in a ROM 13 or a control program or the like stored into an external memory 14 and outputs an image signal as output information to a printing unit (printer engine) 17 connected through a printing unit interface 16. Further, a control program or the like of the CPU 12 as indicated in a later-described flow chart may be stored into the program ROM in the ROM 13. Font data or the like to be used in case of producing the above output information is stored into a font ROM in the ROM 13. In a case that the external memory 14 such as a hard disk or the like is not prepared, information or the like to be utilized on the host computer 2000 is stored into a data ROM in the ROM 13.

The CPU 12 is in a state capable of communicating with the host computer through an input unit 18 and is structured that information or the like in the LBP 1000 can be notified to the host computer 2000. Numeral 19 denotes a RAM which functions as a main memory of the CPU 12, a work area or the like and is structured that memory capacity can be expanded by an optional RAM which is connected to an increased port (not shown). It should be noted that the RAM 19 is used for an output information expansion area, an environmental data storage area, an NVRAM (non-volatile RAM) or the like. The above external memory 14 such as the hard disk (HD), an IC card or the like is controlled to access the printer control unit by a memory controller (MC) 20. The optionally connected external memory 14 stores font data, an emulation program, form data or the like.

Numeral 18 denotes the input unit, where switches used for an operation performed in the above operation panel 1012, the LED display unit and the like are arranged.

It should be noted that the above external memory is not limited to one piece but at least one or more pieces may be provided. That is, it may be structured that plural external memories which stores an optional font card in addition to the built-in font and a program capable of reading a printer language of different language system can be connected to the printer. Further, it may be structured that the printer has an NVRAM (not shown) to store printer mode setting information supplied according, to an instruction from the operation panel 1012.

(Printing Control Procedure)

Next, the printing control procedure in the LBP 1000 constituted by the above structure will be described with reference to flow charts shown in FIGS. 4 to 8.

Figure 4:
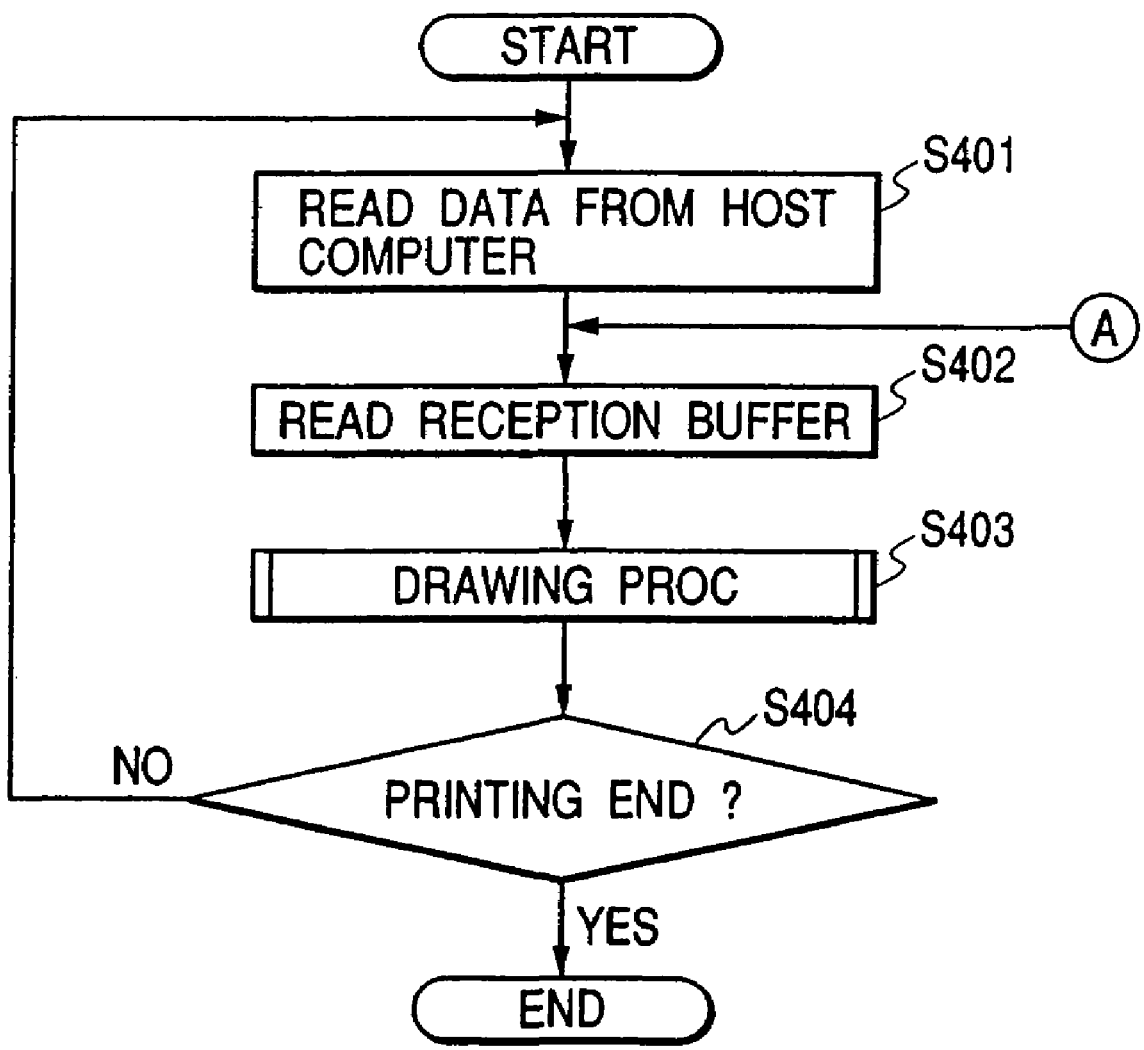
FIG. 4 is a flow chart showing a print control procedure in the first embodiment.

FIG. 4 is a flow chart showing main processing executed in the LBP 1000 from a start of operation to the end of operation.

At first, in a step S401, the printing data transmitted from the host computer 2000 is received and it is stored into the reception buffer 1101. Next, in a step S402, the printing data stored into the reception buffer is read out. Then, drawing processing is executed in a step S403. Thereafter, in a step S404, it is judged whether or not a printing end instruction is received, or the printing data is in an end status. If the printing end, the printing operation ends. However, if not the printing end, the processing from the step S401 is repeated.

Figure 5:
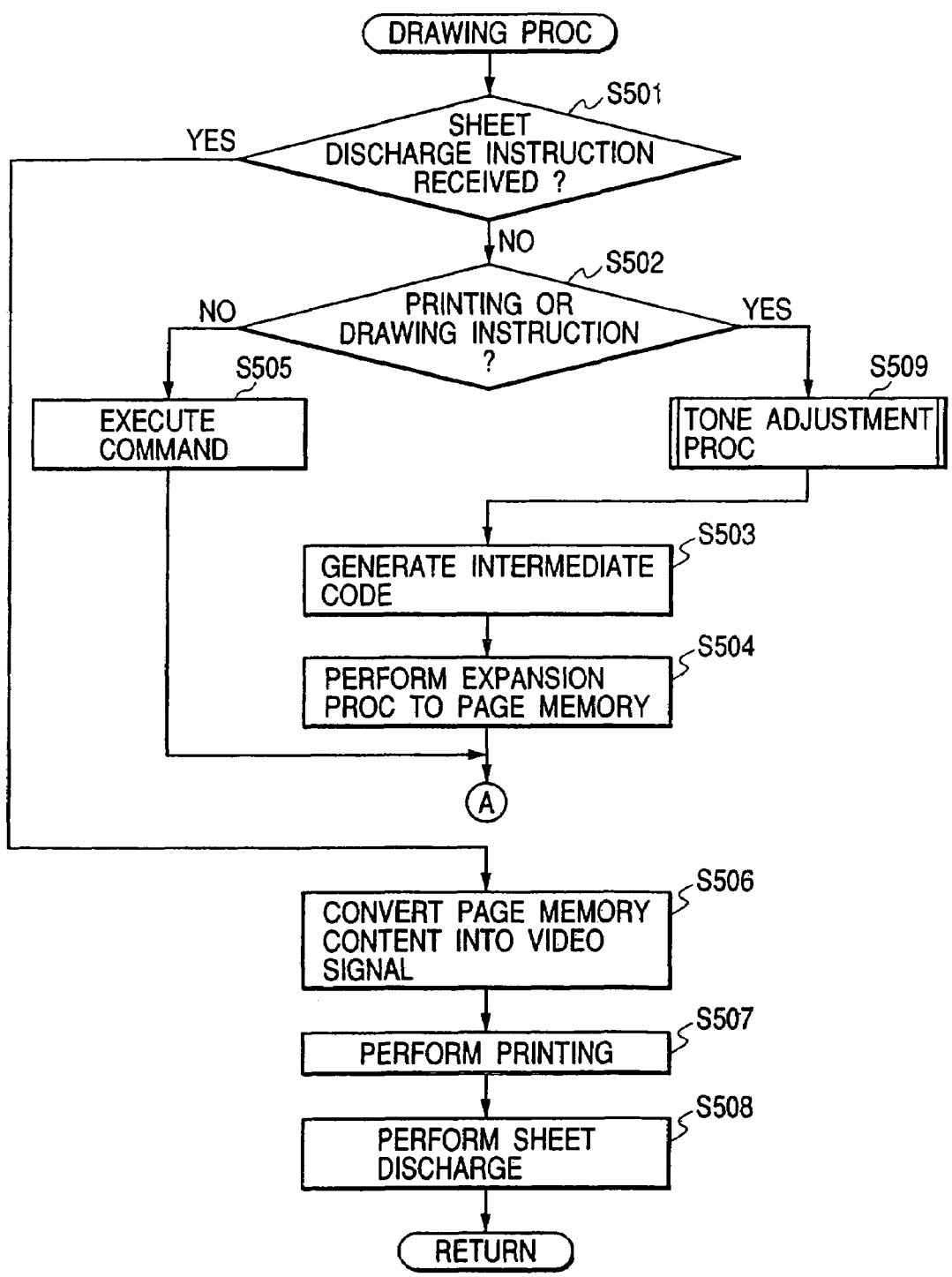
FIG. 5 is a flow chart showing a drawing processing procedure in the first embodiment.

FIG. 5 is a flow chart showing the detail of the drawing processing in the step S403 shown in FIG. 4. This drawing processing is processing of executing an actual printing.

At first, in a step S501, it is checked whether or not data to be processed is a discharge instruction in the command analysis unit 1103. If it is the discharge instruction, the flow advances to a step S506, and if it is not the discharge instruction, the flow advances to a step S502, where it is judged whether or not the analyzed data is a command of accompanying expansion processing to the page memory, such as character printing, figure drawing or the like.

In case of not executing the expansion processing in the step S502, the flow advances to a step S505, where the command is immediately executed. However, in case of executing the expansion processing, the flow advances to a step S509, where tone adjustment processing is executed. Thereafter, in a step S503, an intermediate code being a format of simplifying a command execution is generated. In a step S504, the expansion processing to the page memory 1105 is executed in the command execution unit 1104 upon receiving the intermediate code. After terminating the expansion processing, the flow returns to the step S402 shown in FIG. 4 to repeat data analysis processing.

On the other hand, in the step S501, if it is judged that the data to be processed is the discharge instruction, the flow advances to the step S506, where the content of the page memory 1105 is converted into the video signal for the printer engine unit 1400 in the output control unit 1300 to perform a transference output of the image data. In a step S507, the printer engine unit 1400 forms the permanent visible image onto the recording sheet based on the received video signal, thereby performing the printing. Then, in a step S508, a sheet of the printed result is discharged, thereby terminating printing control processing per one page.

(Tone Adjustment Processing)

Figure 6:
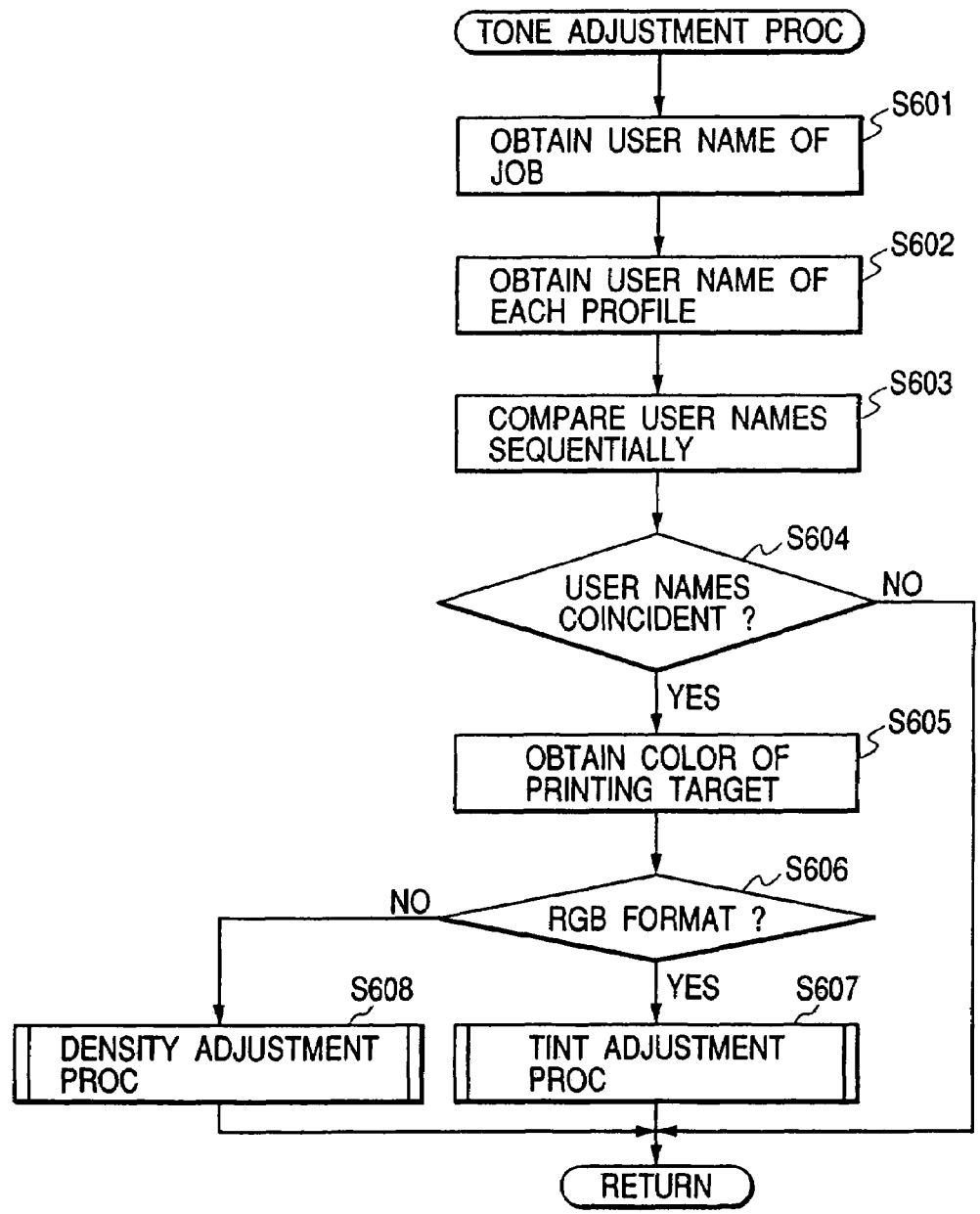
FIG. 6 is a flow chart showing a tone adjustment processing procedure in the first embodiment.

FIG. 6 is a flow chart showing the detail of the tone adjustment processing in the step S509 shown in FIG. 5. This processing is processing of giving the optimal tone adjustment for the user who executed the printing processing.

At first, in a step S601, a user name of a printing job is obtained. The user name of the printing job is transferred from the host computer 2000 when it is started to transfer the printing data, and is previously stored into a memory such as the NVRAM or the like.

Here, a profile every each user is previously registered into the NVRAM, and the user name every the profile is obtained in a step S602. In a step S603, the user name is sequentially compared with user names obtained according to the printing job.

In a step S604, it is judged whether or not a profile having a user name coincided with the user name of the printing job exists. If the above profile does not exist, processing is terminated as it is. In this case, a designated color is output as it is.

On the other hand, in the step S604, if the profile having the coincided user name exists, the flow advances to a step S605, where the color of a printing target (or a printing object) is obtained. If the color of the object is designated by the RGB format in a step S606, the flow advances to a step S607, where tint adjustment processing is executed. However, if the color is not designated by the RGB format, that is, the color is designated by the gray scale (GRAY) format, the flow advances to a step S608, where density adjustment processing is executed.

Next, one example of a method for obtaining the user name of the printing job performed in the step S601 will be described with reference to FIG. 17.

As a method of automatically notifying the user name to an executing person (user) of the printing processing as an attribute of the job without recognizing the own user name, a method of notifying the user name by use of a mail address is prepared. For example, in a case where a document of the printing target is attached to a received E-mail, it is possible to perform the notification by transferring the E-mail to the printer.

Figure 17:
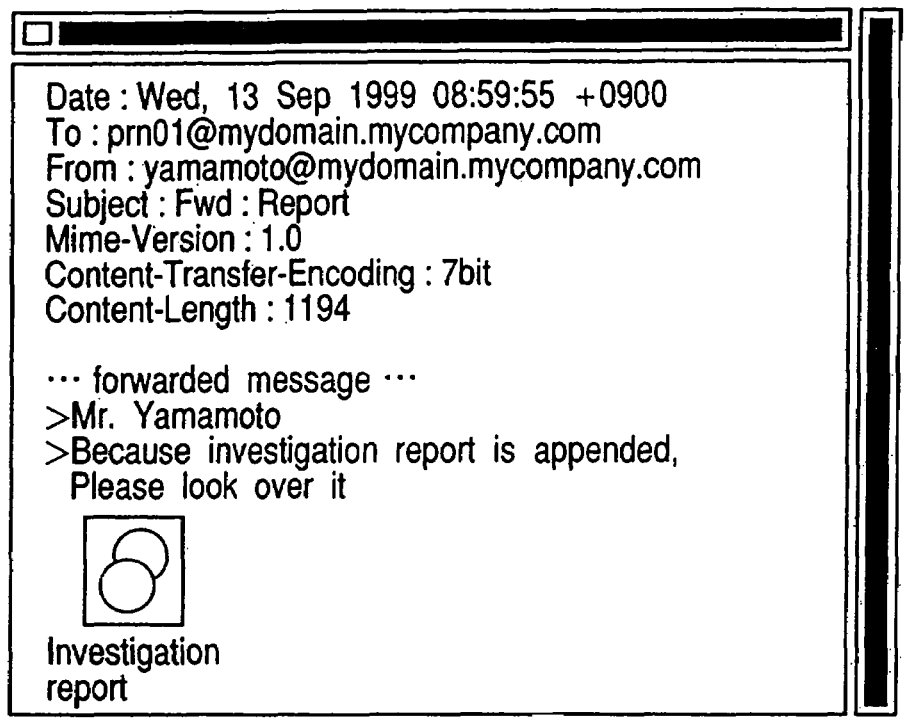
FIG. 17 is a diagram showing an example of an E-mail to which a document of printing target is attached.

FIG. 17 is a diagram showing a display example of an application software (hereinafter, referred as mailer) for transmitting and receiving E-mails. This user transfers the received E-mail to a printer address represented by "prn01@mydomain.mycompany.com" (portion of sending To: in FIG. 17). Since a sender address (portion of sending From: in FIG. 17) is rewritten to a transmitter address when the E-mail is transferred, the printer can specify the user name referring the sender's mail address.

Generally, in an office, since almost the network equipments physically located in near portions are connected to the same domain, in case of actually transferring the E-mail to the printer, a character column to be typed by the user is satisfied by inputting only the "prn01", thereby saving a work.

(Details of Object)

The structure of the above object will be described with reference to FIG. 9.

Figure 9:
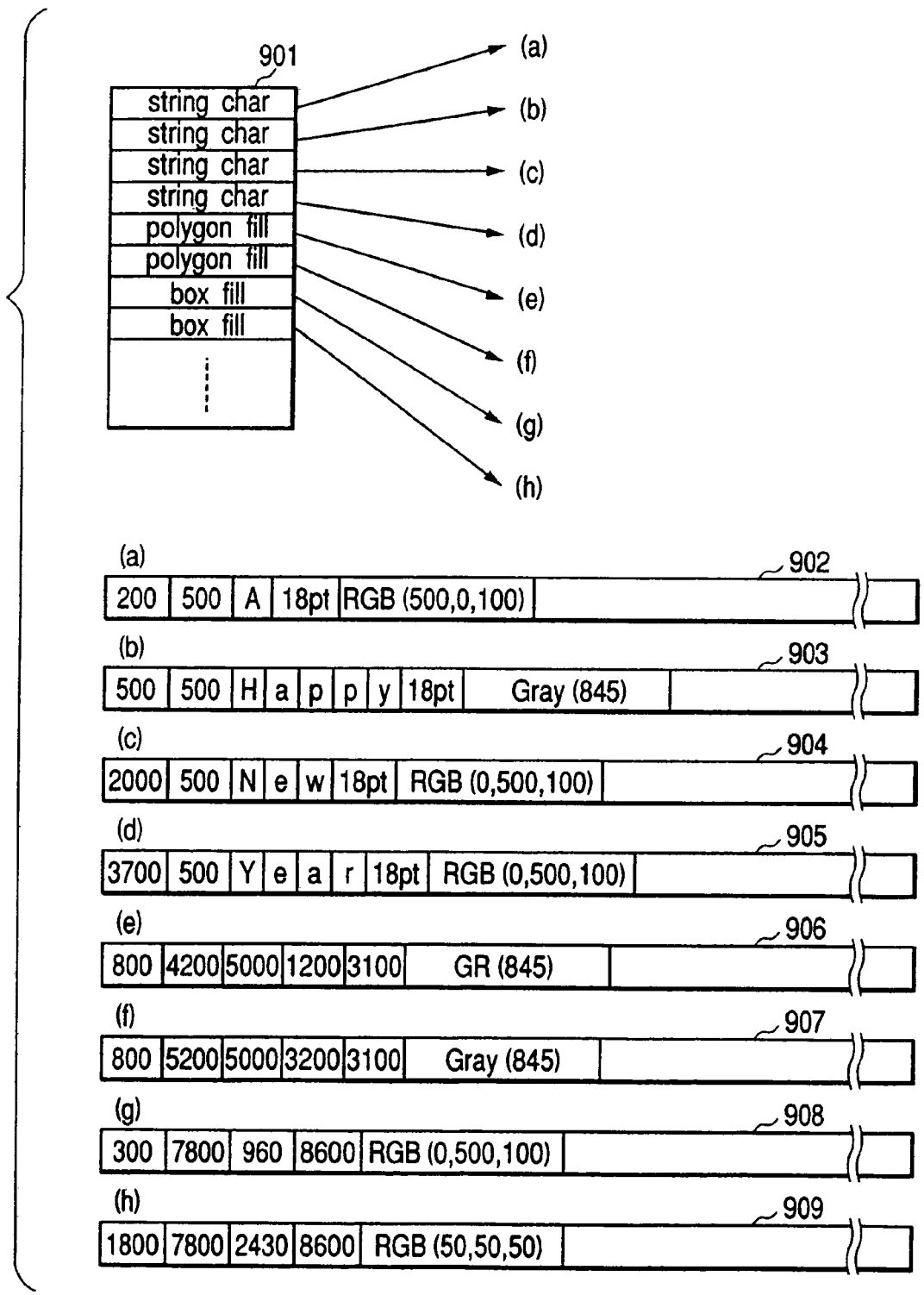
FIG. 9 is a diagram showing structural examples of objects in the first embodiment.

In FIG. 9, numeral 901 denotes an object management table for managing objects in the same page. In the object management table 901, various kinds of descriptions related to character columns (string char), polygons (polygon fill), rectangles (box fill), images and the like are written, and each of tables denoted by reference symbols (a) to (h) is linked to each of the above descriptions. Each of the tables (a) to (h) is linked to each of objects 902 to 909 in which descriptions of attributes such as drawing position, size, external form and the like are written. As one of these information, a description of color information designated by the RGB format or a density value based on the gray scale (GRAY) format is written. The objects 902 to 909 are represented by the intermediate code format after performing a command analysis.

For example, a color designated in the object 902 is expressed by RGB=(500, 0, 100) and a color designated in the object 903 is expressed by a gray value=(845).

(Tint Adjustment Processing)

Figure 7:
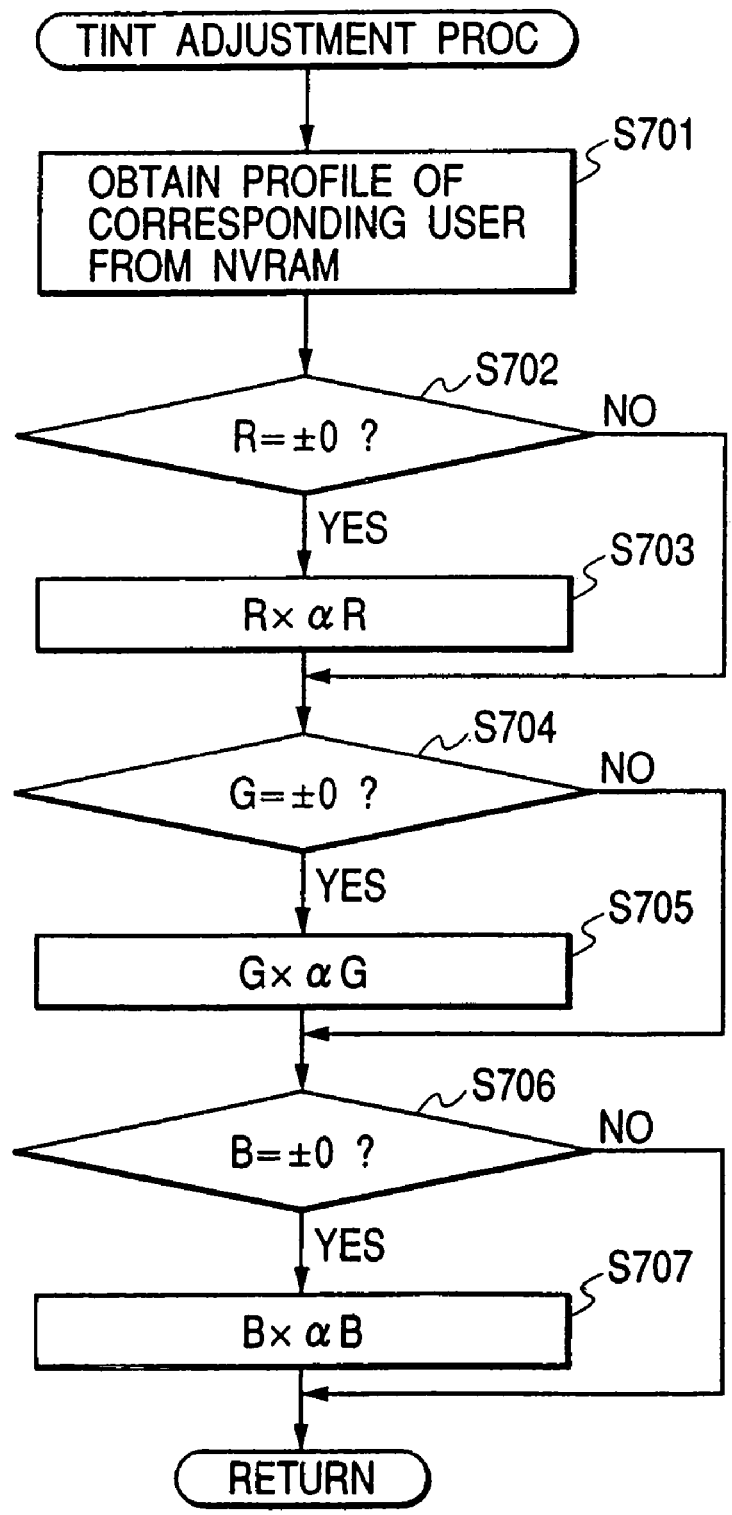
FIG. 7 is a flow chart showing a tint adjustment processing procedure in the first embodiment.

FIG. 7 is a flow chart showing the detail of the tint adjustment processing in the step S607 shown in FIG. 6. This processing is processing of adjusting the color designated by the RGB format.

At first, in a step S701, a profile of corresponding the user is obtained from the NVRAM. Next, in a step S702, it is judged whether or not an adjustment is performed for a value of red (R).

In the present embodiment, for example, in case of not performing any adjustment for the value R, a value "zero" is set as an initial value. On the other hand, if any adjustment is performed for the value R, for example, a value such as "+10", "−20" or the like is set. This value indicates a percentage when the value R is additionally adjusted.

In the step S702, if the value R is adjusted, the value R is to be adjusted in a step S703 according to the following expression.

$$R = R \times \alpha R$$

where, $\alpha R = (100 + R \text{ setting value in profile})/100$

Namely, in a case where a color designation in the object is expressed by R=100, if the value "+10" is set in the profile, the tint of the red (R) is converted into a status expressed by R=110.

On the other hand, in the step S702, if the value R is not adjusted, the flow advances to a step S704 as it is without executing processing to the R (red).

Hereafter, after executing the same processing as that for the red (R) to green (G) and blue (B), the processing is terminated (steps S704 to S707).

(User Interface)

An example of the user interface for adjusting the profile in the present embodiment will be described with reference to FIGS. 11 and 12.

FIG. 11 is a diagram showing a display example on the display unit at the operation panel 1012. An adjustment method of a profile of which user name is "yamamoto" will be described.

As shown in FIG. 11, "yamamoto" is displayed in the most upper column as the user name, "color adjustment" is displayed in a second column as a menu item, "red (R)" is displayed in a third column as a setting item and "+30" is displayed in the most lower column as a setting value. In the most lower column, with respect to arrow marks displayed on the left and right sides, the value is increased by depressing a right arrow key provided on the operation panel 1012 and the value is decreased by depressing a left arrow key on the operation panel 1012.

This value display is similarly displayed regarding colors of "green (G)" and "blue (B)" by changing the setting item in the third column, and the user can rewrite an own profile by setting a desired adjustment value for each item.

FIG. 12 is a diagram showing a display example of the profile content related to the user name "yamamoto" at the operation panel 1012. The profile content can be displayed at an arbitrary timing according to a panel operation performed by the user.

Figure 18:
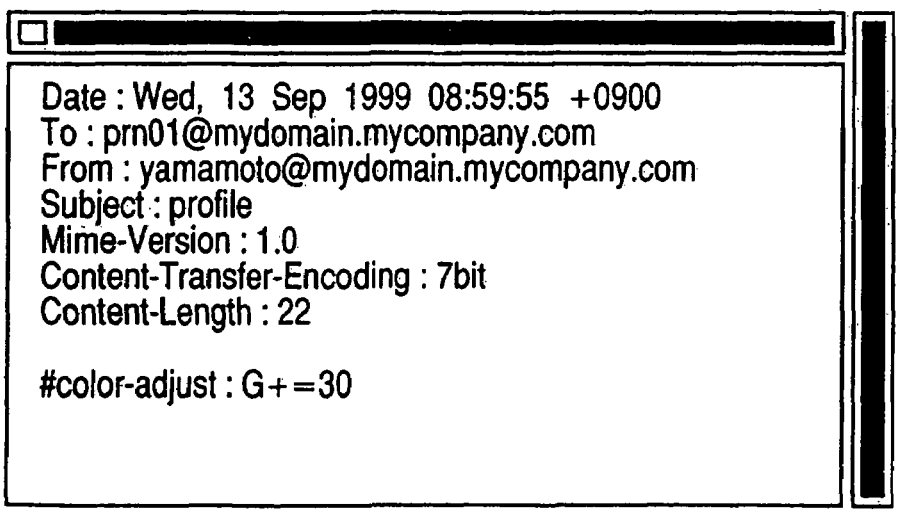
FIG. 18 is a diagram showing an example of an E-mail when a profile is set using the E-mail.

Next, an example of setting the profile using the E-mail from the host computer side will be described. FIG. 18 is a diagram showing a display example of the mailer similar to the case in FIG. 17.

In this case, it is instructed that the value of green is increased by "30" according to one line starting with "#color-adjust:" being an initial text of the E-mail, and the instruction is transmitted to the printer of which address is "prn01". In this way, it is possible to adjust the profile without using the operation panel by describing an adjustment of the profile to a mail text according to a previously determined format. In this case, the printer reads that the line starting with the "#color-adjust" means to designate a profile adjustment, and the profile adjustment can be realized only adding means for writing an instructed value into the NVRAM.

Figures 19, 20:
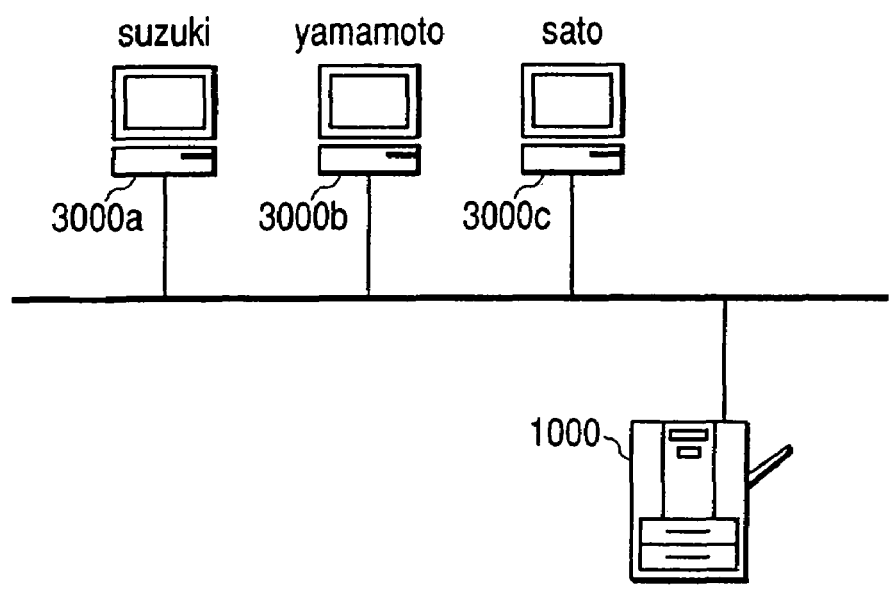
FIG. 19 is a connection diagram of apparatuses which are connected to a network.
FIG. 20 is a diagram for explaining a storage method of storing profiles of plural users.

Further, an example of holding method of holding the profiles of plural users is shown in FIGS. 19 and 20. FIG. 19 is a connection diagram of apparatuses connected to a network, through which the one printer unit 1000 is connected to three units of host computers 3000a to 3000c. The three host computers are used by each of three users whose user names are respectively "Suzuki", "yamamoto" and "sato".

Here, it is assumed that both users "Suzuki" and "sato" perform the printing operation without adjusting the profiles. In this case, the profiles of performing the printing operation of which user names are "suzuki@ . . . " and "sato@ . . . " are produced. Namely, initial value profiles are produced for each of the above user names. Next, if the user "yamamoto" gives an adjustment instruction of increasing the value of green by "30", a profile of which user name is "yamamoto@ . . . " is produced, wherein the value "30" is added to the value of G (green) and the added result is stored into the NVRAM.

In this manner, each user name and corresponding profile values of R, G and B are stored into the NVRAM in the printer 1000 as shown in FIG. 20. In the next printing processing, the profile value coincided with the user name is referred.

(Density Adjustment Processing)

Figure 8:
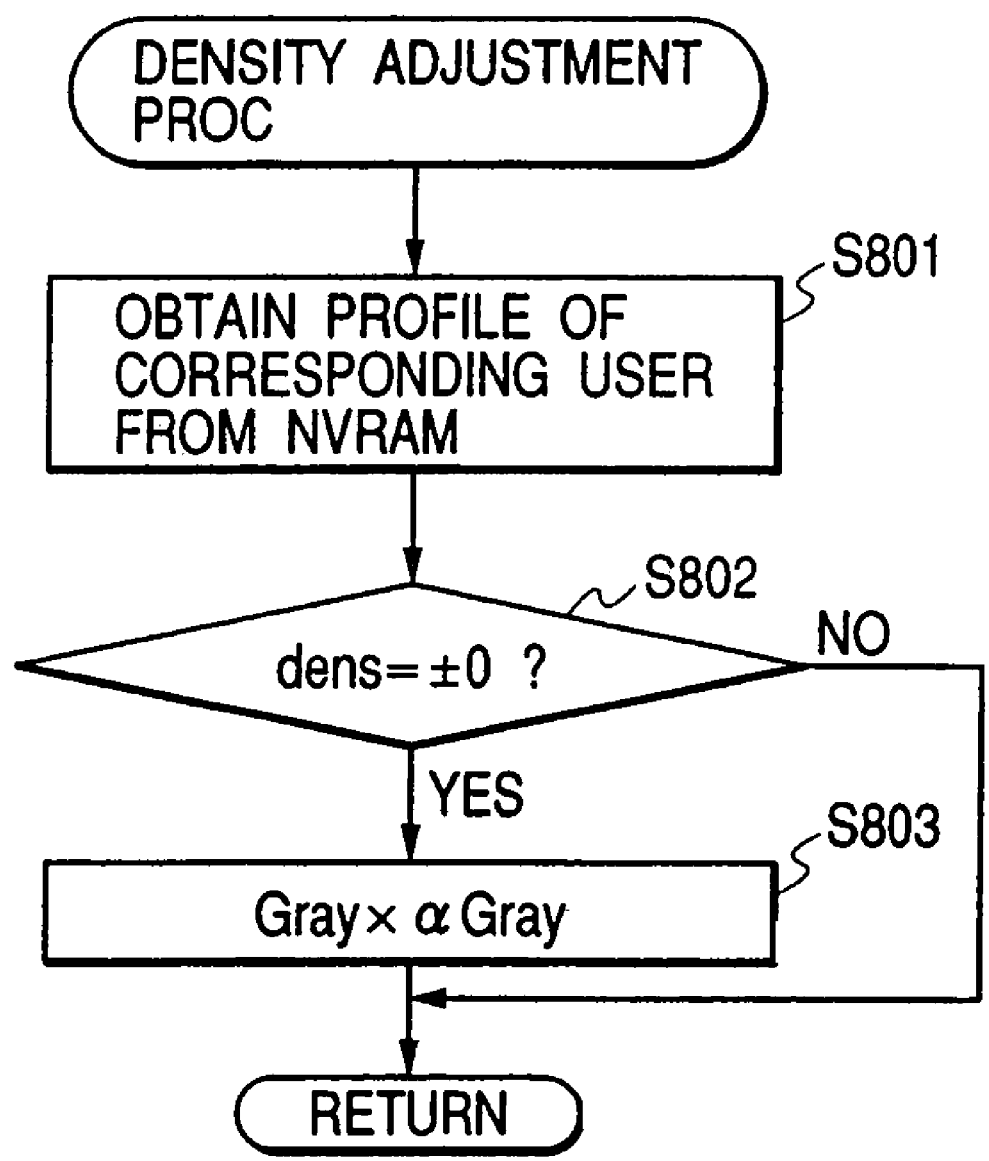
FIG. 8 is a flow chart showing a density adjustment processing procedure in the first embodiment.

FIG. 8 is a flow chart showing the detail of the density adjustment processing in the step S608 shown in FIG. 6. This processing is processing of adjusting the color (density) designated by the GRAY format.

At first, in a step S801, the profile of corresponding the user is obtained from the NVRAM. Next, in a step S802, it is judged whether or not a density value (dens) is adjusted.

In the present embodiment, in case of not performing any adjustment for the density value, a value "zero" is set (dens=0) as an initial value. On the other hand, if any adjustment is performed for the density value, e.g., the value such as "+10", "−20" or the like is set as the dens. This value indicates a percentage when the density value is additionally adjusted.

In the step S802, if the density value is adjusted, a Gray value is to be adjusted in a step S803 according to the following expression.

$$\text{Gray} = \text{Gray} \times \alpha \text{Gray}$$

where, $\alpha \text{Gray} = (100 + \text{dens setting value in profile})/100$

That is, in a case that a color designation in the object is expressed by Gray=100, if the value "+10" is set in the profile, the density is converted into a status expressed by Gray=110.

On the other hand, in the step S802, if the density value is not adjusted, processing is terminated as it is without executing the processing to the Gray.

(Concrete Examples of Printing Results)

FIGS. 10A, 10B, 10C and 10D are diagrams showing printing examples in the present embodiment. Numerals 101 and 102 in FIGS. 10A and 10B respectively denote the printing result of objects which are a red ellipsoid and a green character column.

Here, in case of performing a printing operation of superimposing the object 101 on the object 102, visible condition of a user handicapped in color vision is considered.

Figure 10B:
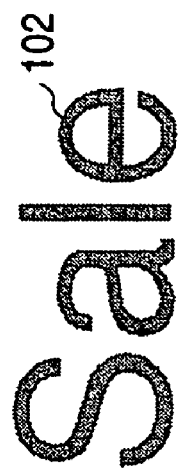
FIGS. 10A, 10B, 10C and 10D are diagrams showing concrete examples of tint adjustment result in the first embodiment.
Figure 10D:
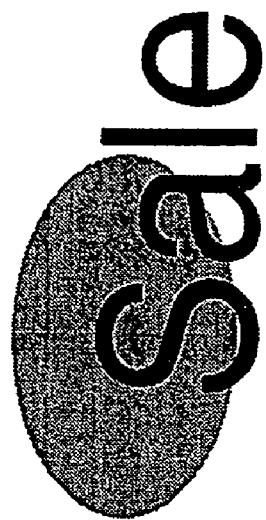
Figure 10A:
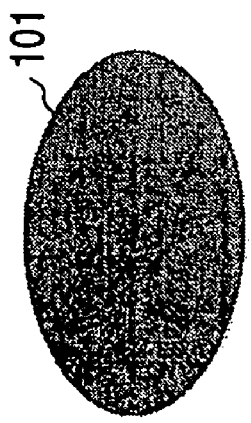
Figure 10C:
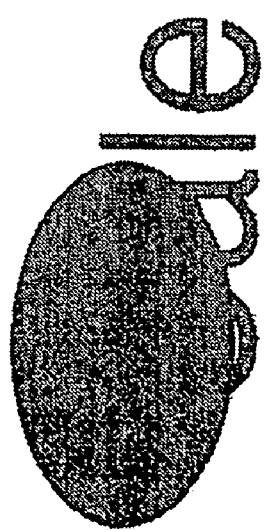

FIG. 10C schematically shows visible condition when the profile is not adjusted, that is, the printing output is performed on the basis of an initial value color. Since the color of the object 101 (red ellipsoid) can not be discriminated from the color of the object 102 (green character column), it is understood that the character can not be recognized.

FIG. 10D schematically shows visible condition when the printing output is performed by increasing especially the value of green according to the profile adjustment in the present embodiment. By this adjustment, since the object 101 is discriminated from the object 102, these objects can be recognized.

As described above, according to the present embodiment, a precise color adjustment fitting to each user can be realized by providing the profile for the color adjustment every user.

It should be noted that the user name is not limited to a mail address of a sender in the E-mail but may be, in case of commonly possessing the printer on a LAN (Local Area Network), a log-in name, a host name, an IP address of TCP/IP (Transmission Control Protocol/Internet Protocol) or the like.

Second Embodiment

Hereinafter, a second embodiment according to the present invention will be described. Since the structure of apparatuses and main processing or the like thereof are same as those which are described with reference to FIGS. 1 to 5 in the above first embodiment, the description will be omitted.

In the above first embodiment, an example that a user directly sets a profile value by an operation on the operation panel 1012 has been described. However, for a user who does not acquaint with color setting, it is not easy to set an optimal value for each color. Therefore, in the second embodiment, it is characterized that the user selects desired color among sample outputs, thereby automatically performing a profile adjustment. Similar to a test printing (status print) function built in an ordinary printer, the sample output in the second embodiment is performed by the operation on the operation panel 1012.

(Sample Output)

Figure 14:
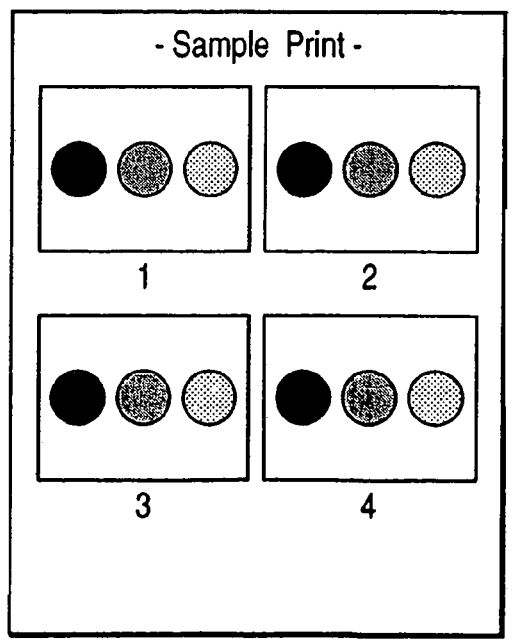
FIG. 14 is a diagram showing examples of sample outputs in the second embodiment.

Examples of the sample outputs in the second embodiment are shown in FIG. 14. Setting examples of four samples respectively indicated by numerals 1 to 4 are shown in FIG. 14. As each of samples, circles are formed by respective colors of red (R), green (G) and blue (B) of which saturation differs every each sample. For example, the sample 1 sequentially indicates three colors of (RGB=1000, 0, 0), (RGB=0, 1000, 0) and (RGB=0, 0, 1000) in the order from the left side. In the sample 2, only the red ratio in the sample 1 is decreased by ten percent. That is, the sample 2 sequentially indicates three colors of (RGB=900, 0, 0), (RGB=0, 1000, 0) and (RGB=0, 0, 1000) in the order from the left side. Similarly, in the sample 3, only the green ratio in the sample 1 is decreased by ten percent. That is, the sample 3 sequentially indicates three colors of (RGB=1000, 0, 0), (RGB=0, 900, 0) and (RGB=0, 0, 1000) in the order from the left side. Also, similarly, in the sample 4, only the blue ratio in the sample 1 is decreased by ten percent. That is, the sample 4 sequentially indicates three colors of (RGB=1000, 0, 0), (RGB=0, 1000, 0) and (RGB=0, 0, 900) in the order from the left side.

The sample outputs shown in FIG. 14 can be output at an arbitrary timing by the operation instructed from the operation panel 1012. Therefore, the user can select the optimal sample number (any of 1, 2, 3 and 4) after confirming an optimal color adjustment by own eyes among the sample outputs at a desired timing.

Of course, the sample outputs in the second embodiment are not limited to the examples shown in FIG. 14, but may be any output format capable of detecting a color adjustment value from sample images. Furthermore, for example, a halftone color may be used.

(User Interface)

The sample number selected by the user as above mentioned is input by the operation panel 1012. Now, the user interface when the selected sample number is input will be described.

FIG. 15 is a diagram showing a display example on a display unit at the operation panel 1012 and a state of inputting the sample number selected by a user "yamamoto". As shown in FIG. 15, "yamamoto" is displayed in the most upper column as a user name, the "sample number" is displayed in a second column as a menu item and the number indicating the sample number to be selected is displayed in a third column. With respect to arrow marks displayed on the left and right sides of the third column, the value is increased by depressing a right arrow key provided on the operation panel 1012 and the value is decreased by depressing a left arrow key on the operation panel 1012.

The user can select a desired sample number by arbitrarily setting the value in the third column.

Next, the user interface when the user name is selected will be described. FIG. 16 is a diagram showing a display example when the user name is selected at the operation panel 1012. As shown in FIG. 16, "user name selection" is displayed in the most upper column as a menu item and the user name is displayed in the second column. With respect to arrow marks displayed on the left and right sides of the second column, the user name is changed every depression of the right and left arrow keys provided on the operation panel 1012. Therefore, the user can easily select an own user name.

(Profile Adjustment)

Next, an example of the profile adjustment using the above sample output in the second embodiment will be described.

Figure 13:
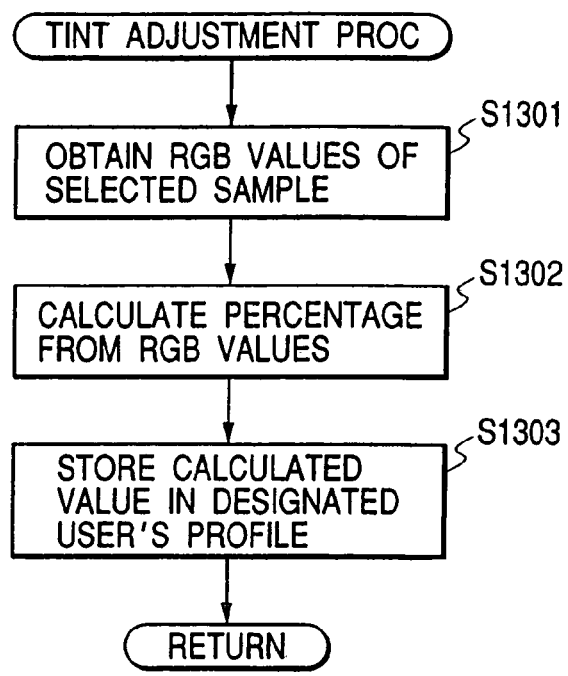
FIG. 13 is a flow chart showing a tint adjustment processing procedure in the second embodiment.

FIG. 13 is a flow chart showing the detail of tint adjustment processing in the step S607 shown in FIG. 6. This processing is processing of adjusting the color designated by an RGB format.

At first, in a step S1301, RGB values of a sample selected by the user are obtained. The RGB values of the sample output in the second embodiment are previously stored into a program ROM. Next, in a step S1302, the percentage of an adjustment range is calculated on the basis of the obtained RGB values. For example, if the second sample shown in FIG. 14 is selected, the RGB values thereof are (RGB=900, 0, 0). Here, since an initial value of the R is "1000", the percentage to be calculated is expressed as follows.

$$(1-900/1000) \times 100 = +10\%$$

Thereafter, the flow advances to a step S1303, where this value is stored into a user profile stored in an NVRAM.

As described above, according to the second embodiment, any user can easily set a desired color adjustment at an arbitrarily timing.

In the above each embodiment, an example of performing the color adjustment based on the RGB format and the gray scale (GRAY) format has been described. However, the present invention is not limited to this case, but may be applicable to another color-expression format such as an L*a*b* format, Luv format or the like.

An example of performing the profile adjustment by inputting an instruction from the operation panel 1012 has been described. However, this instruction input may be performed by the print control command Although an example of setting the color adjustment in the profile by use of an expression of the percentage has been described, setting by use of an expression of the absolute value may be applicable if the color adjustment can be performed by that value.

Furthermore, it may be constituted that the user can select availability or unavailability of a profile setting.

As above, the present invention has been explained with reference to the preferred embodiment. However, the present invention is not limited to this, and various modifications are possible within the spirit and scope of the appended claims.

What is claimed is:

1. An image printing apparatus comprising:
   storage means for storing user profiles for a plurality of users, the user profiles containing information for adjusting the output of a print job;
   input means for inputting the print job, the print job containing a plurality of printing objects; and
   adjustment means for specifying a user who instructs the print job according to print job information and adjusting an object of the plurality of printing objects on the basis of a user profile from the user profiles, the user profile corresponding to the specified user,
   wherein an E-mail to which a document of a printing target is attached, is sent and input to said image printing apparatus as the print job, and
   wherein said adjustment means specifies the user according to a sender address of the E-mail.

2. An apparatus according to claim 1, wherein said adjustment means performs tone adjustment for each printing object.

3. An apparatus according to claim 2, wherein said adjustment means performs tint adjustment if the printing object is a color object and performs density adjustment if the object is a monochrome object.

4. An apparatus according to claim 1, wherein the user profile holds a value for every color component.

5. An apparatus according to claim 4, wherein the profile holds a ratio for a reference value for each color component.

6. An apparatus according to claim 4, wherein the representation of the color components depends on an RGB format and a gray scale format.

7. An apparatus according to claim 1, further comprising instruction input means for inputting a user instruction used for updating the user profile content.

8. An apparatus according to claim 7, further comprising display means for displaying the content of the user profile.

9. An apparatus according to claim 1, further comprising output means for outputting the print job processed by said adjustment means.

10. An apparatus according to claim 9, wherein said output means forms a visible image on a recording medium.

11. An apparatus according to claim 1, further comprising:
    output means for outputting plural sample images which indicate different color adjustment results; and
    selection means for selecting one sample image from among the plural sample images,
    wherein the content of the user profile is updated on the basis of the selected sample image.

12. An image printing method comprising the steps of:
    storing in storage means user profiles of a plurality of users, the user profiles containing information for adjusting the output of a print job;
    inputting the print job, the print job containing a plurality of printing objects; and
    specifying a user who instructs the print job according to print job information and adjusting an object of the plurality of printing objects on the basis of a user profile from the user profiles, the user profile corresponding to the specified user,
    wherein an E-mail to which a document of a printing target is attached, is sent and input to said image printing apparatus as the print job, and
    wherein said adjustment step specifies the user according to a sender address of the E-mail.

* * * * *